United States Patent
Tsutsumi et al.

(10) Patent No.: US 8,311,711 B2
(45) Date of Patent: Nov. 13, 2012

(54) SHIFT CONTROL DEVICE FOR VEHICULAR AUTOMATIC TRANSMISSION

(75) Inventors: Takahiko Tsutsumi, Toyota (JP); Toshio Sugimura, Ann Arbor, MI (US)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 485 days.

(21) Appl. No.: 12/669,169

(22) PCT Filed: Jul. 17, 2008

(86) PCT No.: PCT/JP2008/062946
§ 371 (c)(1),
(2), (4) Date: Mar. 1, 2010

(87) PCT Pub. No.: WO2009/011399
PCT Pub. Date: Jan. 22, 2009

(65) Prior Publication Data
US 2010/0174458 A1 Jul. 8, 2010

(30) Foreign Application Priority Data
Jul. 18, 2007 (JP) ................................. 2007-187386

(51) Int. Cl.
*B60W 10/10* (2012.01)
(52) U.S. Cl. .......................................... 701/52; 477/78
(58) Field of Classification Search ...................... 701/52
See application file for complete search history.

(56) References Cited

U.S. PATENT DOCUMENTS

| 4,748,870 | A | * | 6/1988 | Sugino et al. .................. 477/117 |
| 5,772,554 | A | * | 6/1998 | Tabata ........................... 477/109 |
| 5,904,635 | A | * | 5/1999 | Genise et al. .................. 477/111 |
| 2003/0060329 | A1 | * | 3/2003 | Sato et al. ...................... 477/121 |
| 2006/0014610 | A1 | * | 1/2006 | Matsunaga et al. ............ 477/121 |

FOREIGN PATENT DOCUMENTS

| JP | 06-307526 A | 11/1994 |
| JP | 11-078578 A | 3/1999 |
| JP | 3017501 B2 | 12/1999 |
| JP | 2000-027982 A | 1/2000 |
| JP | 2004-068957 A | 3/2004 |
| JP | 2004-286106 A | 10/2004 |
| JP | 2005-351482 A | 12/2005 |

* cited by examiner

*Primary Examiner* — Shelley Chen
(74) *Attorney, Agent, or Firm* — Sughrue Mion, PLLC

(57) ABSTRACT

A shift control device is provided with a structure wherein when a driver selects a manual shift mode, an appropriate shift level is set as an initial shift level in conformity to a driver's will to have or not to have a drive-force source braking effect. When a shift lever 72 is operatively moved to an S-position to select an S-mode, depending on whether a stay time in a position "D" continuing for a certain time period or more (step S2), a shift mode switching or a manual shift mode direct-selecting is determined, and then an initial shift level is individually determined for a shift mode switching (YES in step S2) and a manual shift mode direct-selecting (NO in step S2). This determines appropriate initial shift level in conformity to the driver's will to have the drive-force source braking effect in the shift mode switching and that not to have the drive-force source braking effect in the manual shift mode direct-selecting.

3 Claims, 7 Drawing Sheets

(a) SKELETON VIEW (b) OPERATION TABLE

|      | C1 | C2 | C3 | C4 | B1 | B2 | F1 |
|------|----|----|----|----|----|----|----|
| P    |    |    |    |    |    |    |    |
| Rev1 |    |    | ○  |    |    | ○  |    |
| Rev2 |    |    |    | ○  |    | ○  |    |
| N    |    |    |    |    |    |    |    |
| 1st  | ○  |    |    |    |    | ◎  | △  |
| 2nd  | ○  |    |    |    | ○  |    |    |
| 3rd  | ○  |    | ○  |    |    |    |    |
| 4th  | ○  |    |    | ○  |    |    |    |
| 5th  | ○  | ○  |    |    |    |    |    |
| 6th  |    | ○  |    | ○  |    |    |    |
| 7th  |    | ○  | ○  |    |    |    |    |
| 8th  |    | ○  |    |    | ○  |    |    |

◎ OPERATED IN ENGINE BRAKING

△ OPERATED ONLY IN VEHICLE DRIVING

| RANGE | GEAR POSITION |
|---|---|
| D | 1,2,3,4,5,6,7,8 |
| 7 | 1,2,3,4,5,6,7 |
| 6 | 1,2,3,4,5,6 |
| 5 | 1,2,3,4,5 |
| 4 | 1,2,3,4 |
| 3 | 1,2,3 |
| 2 | 1,2 |
| L | 1 |

UP ↑ / DOWN ↓

SHIFT CONTROL DEVICE FOR VEHICULAR AUTOMATIC TRANSMISSION

CROSS REFERENCE TOP RELATED APPLICATIONS

This application is a National Stage of International Application No. PCT/JP2008/062946 filed Jul. 17, 2008, claiming priority based on Japanese Patent Application No. 2007-187386, filed Jul. 18, 2007, the contents of all of which are incorporated herein by reference in their entirety.

FIELD OF THE INVENTION

The present invention relates to shift control device for vehicular automatic transmission and, more particularly, to a technology of a shift control device for a vehicular automatic transmission, enabled to alternatively select a manual shift mode and an automatic shift mode according to a driver's operation, in which gear positions or shift ranges in the beginning of the manual shift mode can be appropriately determined.

DESCRIPTION OF THE RELATED ART

A shift control device for a vehicular automatic transmission has heretofore been known with a structure having (a) a manual shift mode which switches a shift level to that to a higher speed area or a lower speed area (shift level corresponding to a higher speed or a lower speed) sequentially from a plurality of predetermined shift levels (such as, for instance, gear ratios or speed ratios, gear positions or shift ranges) in accordance with a shift command based on a manual operation by a driver; (b) an automatic shift mode for automatically altering the gear ratios or the gear positions in accordance with a predetermined shift rule; and (c) a selection operating member operative to alternatively select the manual shift mode and the automatic shift mode. A device disclosed in Patent Publication 1 represents such an example. With such a structure, operating a shift lever from a position "D" to a position "M" allows the automatic shift mode to be switched to the manual shift mode. In addition, an initial shift level in the beginning of the manual shift mode is set in a shift level equal to or lower than a shift level corresponding to the gear ratio or the gear position set based on a vehicle speed or a road surface gradient etc. in the automatic shift mode. This renders drive performance, for instance, an engine braking effect as desired by the driver in the beginning of the mode being switched and later.

[Patent Publication 1] Japanese Patent Publication No. 2004-68957

With such a conventional shift control device, however, the initial shift levels in the beginning of the manual shift mode are determined assuming that a shift mode is switched from the automatic shift mode to the manual shift mode with a desire to have a drive-force source braking effect during a vehicle running. Therefore, when the driver selects the manual shift mode in the beginning of driving the vehicle for instance with no desire to have the drive-force source braking effect, the shift level in the lower speed area is set as or to be the initial shift level, and the shift level as intended by the driver cannot be necessarily determined. That is, in general, a conventional shift lever is operated to a manual shift mode selecting position such as a position "S" or a position "M" or the like in route through an automatic shift mode selecting position such as a position "D". Therefore, even if the shift lever is operated to the manual shift mode selecting position during a halt of the vehicle, the shift mode is switched to the manual shift mode in route through the automatic shift mode. Thus, discrimination is difficult between the mode switching operation during the vehicle halt and the mode switching operation in which the shift mode is switched from the automatic shift mode to the manual shift mode with the desire to have the drive-force source engine braking effect during the vehicle running.

For example, if the shift range on the lower speed area, in which a shift area in a higher speed area is limited or restricted, is set as the initial shift level and the vehicle is driven succeedingly under such a state, there is a fear of deteriorations in fuel consumption and drive performance, and increase in load of hardware due to rise in oil temperature. Further, for selecting the manual shift mode with no desire to have the drive-force source engine braking effect during the vehicle running, the shift lever is moved for instance from a neutral position to the manual shift mode selecting position via the automatic shift mode selecting position such as the position "D", etc. Even in such a case, the shift level in lower speed area is set as the initial shift level against a driver's will, and the automatic transmission is downshifted, causing uncomfortable feeling of the driver. Thus, there is still room for improvement.

SUMMARY OF THE INVENTION

The present invention has been completed with the above view in mind, and has an object to allow an initial shift level to be set to an appropriate shift level in further conformity to the driver's will to have or not to have a drive-force source engine braking effect when the driver selects a manual shift mode.

For achieving the above object, a first aspect of the present invention provides (a) a manual shift mode which switches a shift level to that to a higher speed area or a lower speed area sequentially from a plurality of predetermined shift levels in accordance with a shift command based on a manual operation by a driver, (b) an automatic shift mode in which gear ratios or gear positions are automatically altered in accordance with a predetermined shift rule, and a selection operating member operative to alternatively select the manual shift mode and the automatic shift mode. The shift control device comprises initial shift level setting means that determines when the manual shift mode is selected by the selection operating member, a shift mode switching or a manual shift mode direct-selecting based on whether the manual shift mode is switched from the automatic shift mode continuing for a predetermined certain time period or more, and that sets in the shift mode switching, shift level in a lower speed area than that in the manual shift mode direct-selecting, as an initial shift level in the beginning of the manual shift mode.

A second aspect of the present invention is featured by, in the first aspect, that the shift level are a plurality of shift ranges different in shift areas in higher speed area with lower speed ratios in a continuously variable transmission or a step-variable transmission.

A third aspect of the present invention is featured by, in the first aspect, that the shift level are the speed ratio of a continuously variable transmission or a plurality of gear positions of a step-variable transmission.

According to the shift control device for a vehicular automatic transmission of the first aspect, initial shift level setting means determines when the manual shift mode is selected by the selection operating member, a shift mode switching or a manual shift mode direct-selecting based on whether the manual shift mode is switched from the automatic shift mode continuing for a predetermined certain time period or more, and sets in the shift mode switching, shift level in a lower speed area than that in the manual shift mode direct-selecting, as an initial shift level in the beginning of the manual shift mode. Even when the selection operating member (shift lever) cannot operatively move to the manual shift mode selecting position without a route through the automatic shift mode selecting position, the selection operating member is likely to immediately move from the neutral position or the like to the manual shift mode selecting position during a halt or a vehicle running. Such a situation, the manual shift mode is determined as a case of a manual shift mode direct-selecting with the manual shift mode being directly selected which can be discriminated from a case of the shift mode switching switched from the automatic shift mode. Thus, appropriate initial shift level can be set in conformity to the respective driver's wills to have the power-drive source braking effect in the shift mode switching and not to have the power-drive source braking effect in the manual shift mode direct-selecting.

In the shift mode switching, the shift level in a lower speed area than that in the manual shift mode direct-selecting is set as the initial shift level. Therefore, in the shift mode switching with the automatic shift mode switched to the manual shift mode during the vehicle running for instance a downhill or the like, a gear position, a gear ratio or a shift range is set in the lower speed areas from the beginning of the manual shift mode. This initiates the downshift of the automatic transmission to immediately obtain certain drive performance (with the drive-force source braking effect or the like) in conformity to the driver's will. On the contrary, in the manual shift mode direct-selecting, the manual shift mode is selected with the selection operating member operatively moved to the manual shift mode selecting position from for instance the neutral position or the like during the vehicle running with or without a route through the automatic shift mode selecting position. In the manual mode direct selecting mode, a gear position, a gear ratio or a shift range in a higher speed area of which gear ratio is lower than that in the shift mode switching, is set. This prevents the driver from suffering uncomfortable feeling due to the occurrence of the downshift of the automatic transmission like in the shift mode switching, which is against the driver's will.

In the manual shift mode in a range hold, moreover, a plurality of shift ranges for instance different in shift areas in higher speed area with lower gear ratios are set in accordance with shift commands. In the manual shift mode direct-selecting with the selection operating member operatively moved to the manual shift mode selecting position during the halt of the vehicle, a shift range in a higher speed area of which gear ratio is lower than that in the shift mode switching, i.e., a shift range having for instance the highest speed with the widest shift area, is set as the initial shift level. Thus, an appropriate shift control can be performed as intended by the driver, so that, there is no fear of deteriorations in fuel economy and drive performance and an increase in load of hardware caused by rise in oil temperature, in the succeeding driving of the vehicle.

The present invention may be also applied to step-variable transmission of a planetary gear type and a parallel shaft type, each having a plurality of gear positions different in speed ratio, and a continuously variable transmission of a belt type or the like that can continuously vary a speed ratio (gear ratio).

The shift levels controlled in the manual shift mode are one of speed ratios of the continuously variable transmission, a plurality of gear positions of the step-variable transmission or a plurality of shift ranges different in shift areas. For the shift ranges for instance a plurality of shift ranges different in shift areas in the higher speed area with a lower speed ratio are determined. The shift ranges may be not only a plurality of shift ranges different in upper limit (a higher speed area with a lower speed ratio) of a control area in speed ratio of the continuously variable transmission, but also a plurality of shift ranges different in their upper limits (a gear position in a higher speed area with a lower gear ratio) of a gear position to be automatically switched in the step-variable transmission. For the speed ratios to be switched in the manual shift mode of the continuously variable transmission as the shift levels, a plurality of speed ratios preliminarily determined step by step like the step-variable transmission are switched in accordance with a shift command by the driver.

The manual shift mode may be executed as a gear-position hold in which the gear positions or the speed ratios are switched or a range hold in which the plurality of shift ranges are switched, and an arrangement that enables the driver to arbitrarily select one of the gear-position hold and the range hold is also allowed. The gear-position hold may be executed as not only switching gear positions in the step-variable transmission but also varying the speed ratios in the continuously variable transmission step by step. In the manual shift mode, the relevant speed ratios or gear positions, or shift ranges can be sequentially switched to the higher speed areas or the lower speed areas in accordance with shift commands effectuated by, for instance, an upshift switch or downshift switch (push buttons or levers, etc.).

For the shift levels arranged in the form of the shift ranges, a plurality of shift rages different in upper limit (the higher speed area with a lower gear ratio) of the shift areas of the gear ratios or the gear positions are generally set whereby the shift ranges can be electrically switched in accordance with the shift commands by the driver. In each of the shift ranges, shifting is automatically performed within the shift area of the gear ratio or the gear position in accordance with a shift rule such as a shift map and a calculation formula that are preliminarily determined in terms of parameters representing operating states such as for instance the vehicle speed and the accelerator opening or the throttle valve opening, etc.

During an operation with the drive-force source braking effect being applied on the downhill or the like, the speed ratio or the gear position is usually allocated with the maximum speed in the relevant shift range. Therefore, when the shift range is switched to the lower speed area in accordance with the shift command by the driver, a shifting (downshift) is performed between the speed ratios or between the gear positions with the maximum speed in each of the shift ranges, and drive-force source engine braking effect is increased.

The automatic shift mode is arranged such that the gear ratios and the gear positions are automatically switched each within the widest shift area in accordance with a predetermined shift rule. The shift rule to switch the shift range in the manual mode may be the same one to that used in automatically switching the gear ratio or the gear position in each shift range. However, the shift rule may be different.

The selection operating member, operative to alternatively select the manual shift mode and the automatic shift mode, is defined by a shift lever that can be operatively moved to for instance a position "D" (Drive) for selecting the automatic shift mode, and an a position "S" (Sequential) or a position "M" (Manual) etc., for selecting the manual shift mode. The selection operating member may be implemented in various modes such as a push-button type switch, a lever switch, an automatic-return type momentary switch and a touch panel switch, etc. The present invention is preferably applied to the following cases. The shift lever may be defined by for instance a structure that cannot be operatively moved to the manual shift mode selecting position such as the position "S" and the position "M" or the like without route through the automatic shift mode selecting position such as the position "D". The shift lever is structured such that even when the manual shift mode is selected by the switch operation, the switching operation to the manual shift mode is made effective provided that for instance the automatic shift mode is currently selected. In addition, even when the manual shift mode can be directly selected, the present invention can have the advantageous effect when the automatic shift mode is erroneously selected, once and then the switching operation is immediately performed to the manual shift mode for instance.

A state where the manual shift mode is selected by the selection operating member and the manual shift mode is switched from the automatic shift mode, and the automatic shift mode continuously remains for a predetermined certain time period or more generally corresponds to the shift mode switching where the automatic shift mode is switched to the manual shift mode during a drive operation. In such shift mode switching, there is desire to have the drive-force source braking effect on running on for instance the downhill or the like. Then, a gear position, a gear ratio or a shift range whose upper limit is the gear position or the gear ratio is determined as the initial shift level at the time based on the gear ratio or the gear position in the automatic shift mode, that is, determined to be predetermined step(s) (for instance a step) lower than that in the automatic shift mode. In addition, a shift level can be set in various modes on considering the drive state such as the vehicle speed, the road surface gradient or the like as accomplished in Patent Publication 1 discussed above.

The manual shift mode direct-selecting occurs when the manual shift mode is selected before for instance the beginning of the vehicle running, or when the manual shift mode is selected by operatively moving the selection operating member to the manual shift mode selecting position from the position "N" (Neutral), etc., with or without a route through the automatic shift mode selecting position during the vehicle running. In such a manual shift mode direct-selecting, in contrast to the shift mode switching, it is not necessary the case that the driver desires the drive-force source braking effect. If the shift level is defined by for instance the shift range, a shift range having the widest shifting area is set as the initial shift level. The shift level, defined by the gear ratio or the gear position, may suffice to be set depending on the vehicle state such as the vehicle speed, and/or the accelerator opening or the like at relevant timing. During the halt of the vehicle, for instance, the maximum gear ratio and the lowest gear position may be set as the initial shift level.

The initial shift-level setting means serves to set the shift level in the lower speed area than that in the manual shift mode direct-selecting, as the initial shift level in the shift mode switching. However, the initial shift level does not necessarily lie at the shift level on the lower speed area at all times. For instance in case of a gear-position hold, if the manual shift mode is selected during the halt of the vehicle, the maximum speed ratio or the lowest gear position may suffice to be set as the initial shift level, regardless of the occasions in the shift mode switching or the manual shift mode direct-selecting. In the shift mode switching, the shift level in the lower speed area than that in the manual shift mode direct-selecting, may suffice to be set as the initial shift level, only for a case in which the manual shift mode is selected during the vehicle running. That is, in the shift mode switching, the shift level equal to the shift level in the manual shift mode direct-selecting, or the shift level in the lower speed area than that in the manual shift mode direct-selecting, may suffice to be set as the initial shift level.

Further, the initial shift level may be set in various modes. That is, for instance, for the shift mode switching, the initial shift level may be set in accordance with a setting condition preset assuming that the drive-force source braking effect is desired. For the manual shift mode direct-selecting, the initial shift level may be set in accordance with another setting condition preset with another assumption that no drive-force source braking effect is desired. That is, at least in the shift mode switching, the shift level in the lower speed area than that in the manual shift mode direct-selecting, may suffice to be set as the initial shift level as a result. When the shift level is defined by a plurality of shift ranges different in upper limit of the shift areas, the initial shift level in the manual shift mode direct-selecting may be uniformly set to include the shift range having the maximum speed with the widest shifting area. For the shift mode switching, the initial shift level may be set based on the current vehicle speed and road surface gradient or the like, or a gear ratio and a gear position or the like in the last automatic shift mode such that a certain drive-force braking effect is obtained, regardless of the initial shift level for the manual shift mode direct-selecting.

EXPLANATION OF REFERENCES

Figure 1:
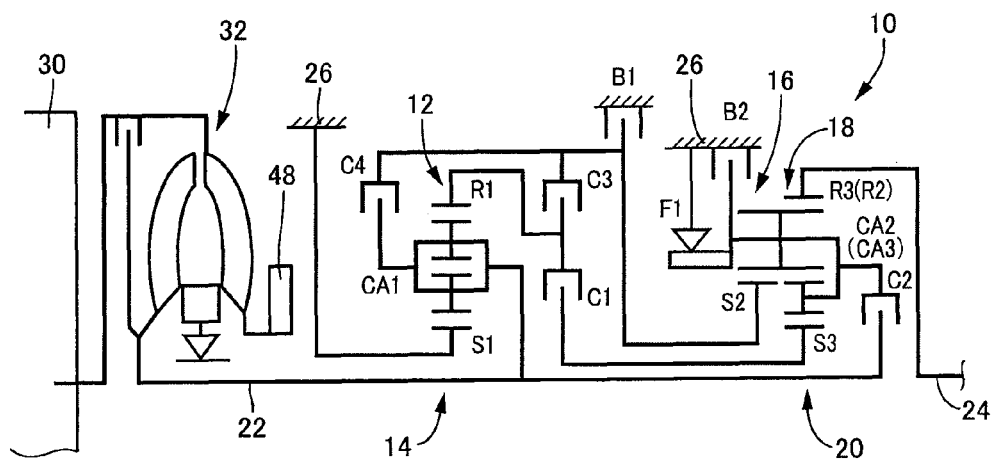
FIG. 1 is a set of views illustrating a vehicular automatic transmission to which the present invention is applied, with FIG. 1(a) being a skeleton view and FIG. 1(b) being an operation table illustrating operating states of engaging elements for establishing respective gear positions.

10: automatic transmission
72: shift lever (selection operating member)
90: electronic control device
104: shift control means
112: automatic shift control means (automatic shift mode)
114: manual shift control means (manual shift mode)
116: initial shift-range setting means (initial shift level setting means)
120: S-mode switch (selection operating member)
$R_{UP}$: upshift command (shift command)
$R_{DN}$: downshift command (shift command)

DETAILED DESCRIPTION OF THE PREFERRED EMBODIMENTS

Now, various embodiments according to the present invention desire be described below in detail with reference to the accompanying drawings.

Embodiment

FIG. 1(a) is a skeleton view of a vehicular automatic transmission 10 and FIG. 1(b) is an operation table illustrating operating states of engaging elements when a plurality of gear positions is established. The automatic transmission 10 is preferably applied to an FF vehicle with the automatic transmission 10 installed in a fore and aft (longitudinally-mounted) direction. The automatic transmission 10 includes a first shifting portion 14 mainly comprised of a first planetary gear set 12 of a double pinion type, and a second shifting portion 20 mainly comprised of a second planetary gear set 16 of a single pinion type and a third planetary gear set 18 of a double pinion type. The first and second shifting portions 14 and 20 are disposed on a coaxial relationship to output the rotation of an input shaft 22 at a shifted speed ratio from an output shaft 24. The input shaft 22 corresponding to an input member in the illustrated embodiment, is a turbine shaft of a torque converter 32 that is drivably rotated by an engine 30 acting as a drive-force source. An output shaft 24, corresponding to an output member, drivably rotates left and right drive wheels via a propeller shaft and a differential gear unit. In addition, the automatic transmission 10 has a substantially symmetric structure with respect to a centerline with a lower half of the centerline being omitted in FIG. 1(a).

Figure 2:
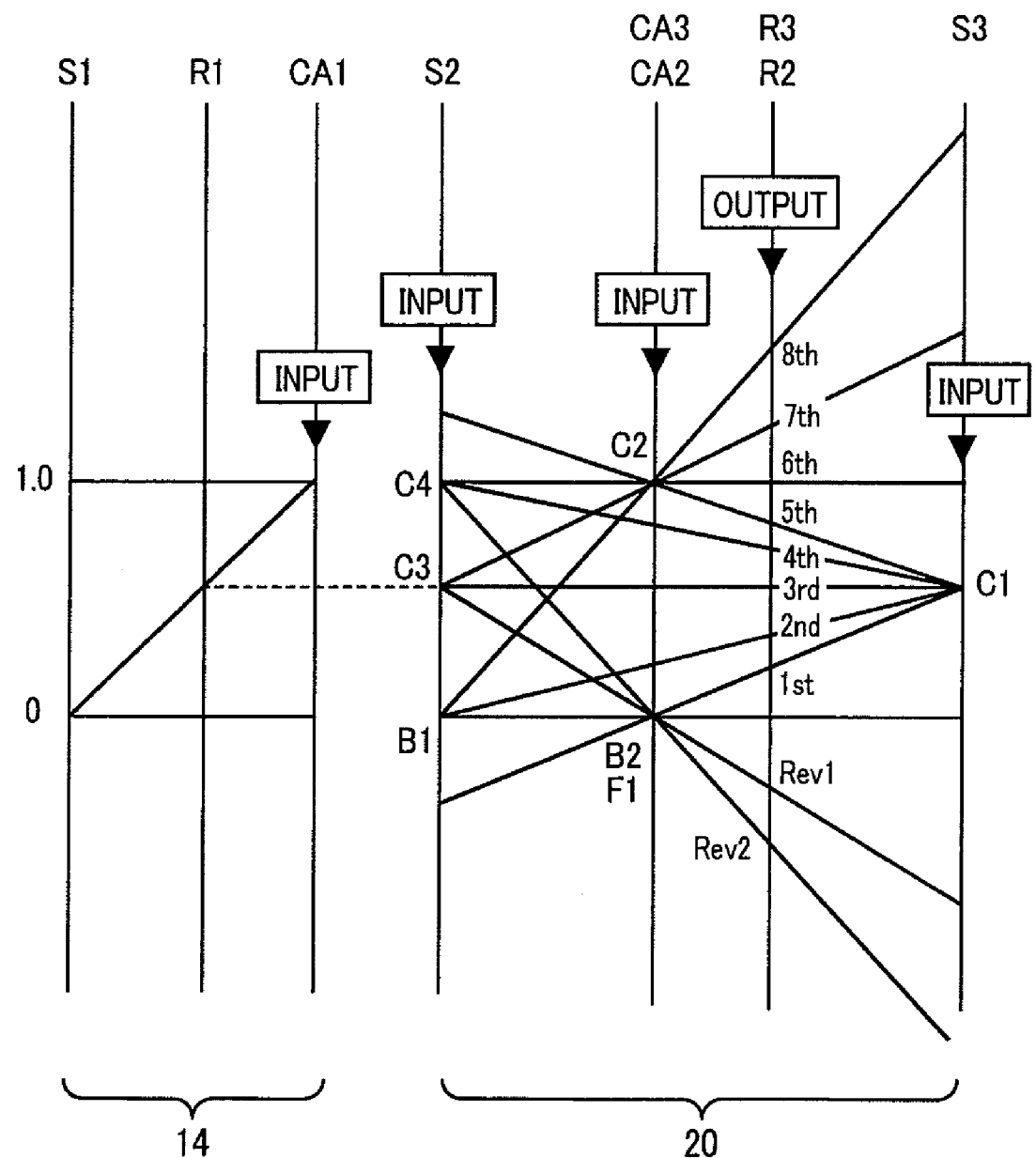
FIG. 2 is a collinear chart of the vehicular automatic transmission shown in FIG. 1, in which rotational speeds of respective rotary elements can be connected to each other on linear lines for the every gear positions.

FIG. 2 shows a collinear chart that can represent rotation speeds of respective rotary elements (sun gears S1 to S3, carriers CA1 to CA3 and ring gears R1 to R3) of the first and second shifting portions 14 and 20 of the automatic transmission 10. A lower horizontal line indicates the rotation speed at "0" and an upper horizontal line indicates the rotation speed at "1.0", i.e., the same rotation speed as that of the input shaft 22. Depending on the operating states (engagement and disengagement) of clutches C1 to C4 and brakes B1 and B2, eight forward-drive gear positions including a 1st-speed gear position "1st" to an 8th-speed gear position "8th", and two reverse-drive gear positions including first and second rear-drive gear positions "Rev1" and "Rev2", are established. The operation table shown in FIG. 1(b) summarizes the relationships between the respective gear positions and the operating states of the clutches C1 to C4 and the brakes B1 and B2, with a symbol "○" indicating the engagement and a symbol "⊙" indicating the engagement achieved only when engine braking is effectuated. A one-way clutch F1 is disposed in parallel to the brake B2 which establishes the 1st-speed gear position "1st", and hence, there is no need for the brake B2 to be engaged upon start (acceleration). Further, the respective gear positions have speed ratios (input-shaft speed $N_{IN}$/output-shaft speed $N_{OUT}$) suitably set on respective gear ratios (the number of gear teeth of the sun gear/the number of gear teeth of the ring gear) ρ1, ρ2 and ρ3 of the first, second and third planetary gear units 12, 16 and 18. Among them, the 1st-speed gear position "1st" has the greatest speed ratio, and the higher (closer to the 8th-speed gear position) the gear position is, the smaller the speed ratio becomes. In addition, in FIG. 1(a) reference "26" indicates a transmission case and reference "48" a mechanical type oil pump.

The clutches C1 to C4 and the brakes B1 and B2 are hydraulic friction engaging devices that are controllably engaged by hydraulic actuators such as multi-disc type clutches or brakes. Energizing, de-energizing or controlling current values of solenoid valves and linear solenoid valves incorporated in a hydraulic control circuit 98 (see FIG. 3) switches the engagement and disengagement states and controls transitional hydraulic pressures for engagement and disengagement.

Figure 3:
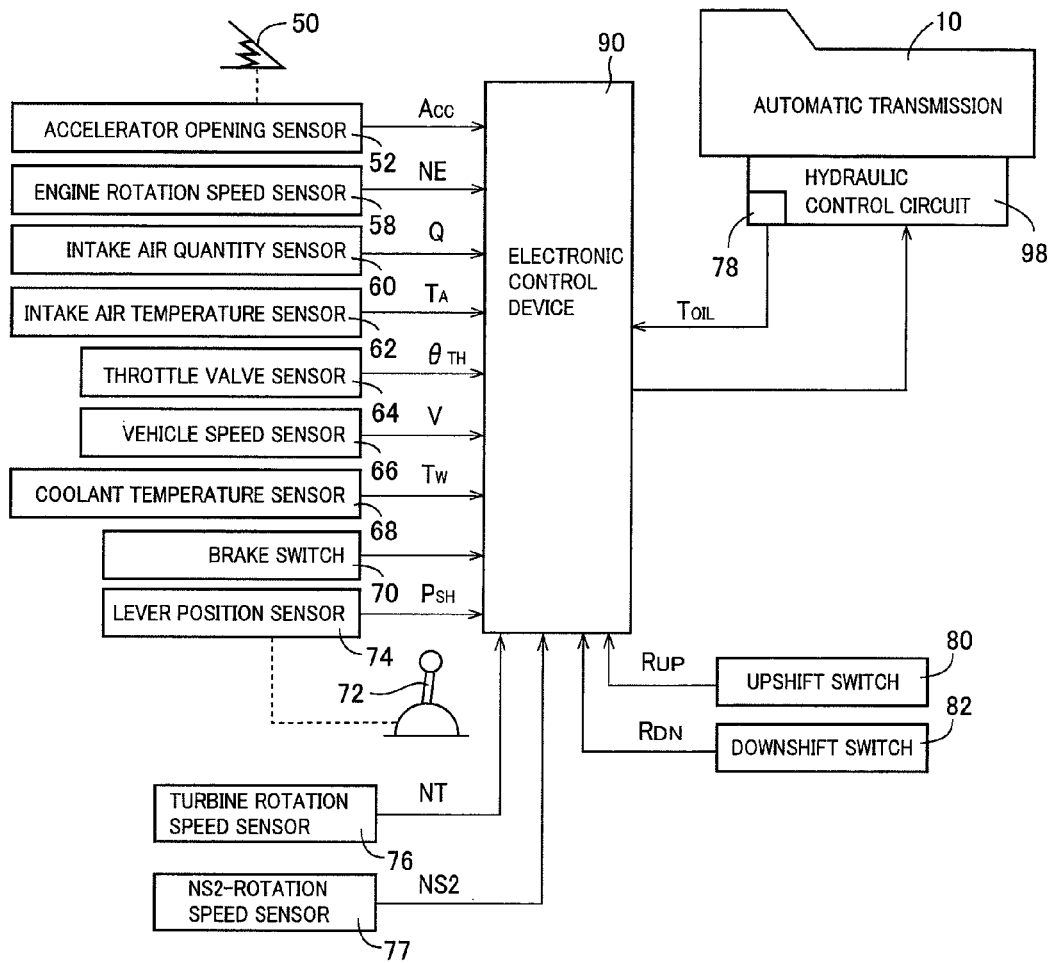
FIG. 3 is a block diagram illustrating a major part of a control system incorporated in the vehicular automatic transmission shown in FIG. 1.

FIG. 3 is a block diagram illustrating a control system incorporated in the vehicle for controlling the automatic transmission 10 or the like shown in FIG. 1, in which an accelerator opening sensor 52 detects an accelerator opening Acc indicative of an operated stroke of an accelerator pedal 50, with a signal representing such an accelerator opening Acc being supplied to an electronic control device 90. The accelerator pedal 50 is of the type to be deeply depressed depending on a driver's output demand, and corresponds to an accelerator operation member with the accelerator opening Acc corresponding to the output demand. An engine rotation speed sensor 58 for detecting a rotation speed NE of the engine 30; an intake air quantity sensor 60 for detecting an intake air quantity Q of the engine 30; an intake air temperature sensor 62 for detecting a temperature $T_A$ of intake air; an idle-switch-equipped throttle sensor 64 for detecting a fully closed state (idling state) and an opening degree $θ_{TH}$ of an electronic throttle valve of the engine 30; a vehicle speed sensor 66 for detecting a vehicle speed V (corresponding to the output-shaft speed $N_{OUT}$ of the output shaft 24); and a coolant temperature sensor 68 for detecting a coolant water temperature $T_W$ of the engine 30 are provided.

Further, a brake switch 70 for detecting the presence or absence of an operation of a foot brake serving as a normal service brake; a lever position sensor 74 for detecting a lever position (operated position "D") $P_{SH}$ of a shift lever 72; a turbine rotation speed sensor 76 for detecting a turbine rotation speed NT (=rotation speed $N_{IN}$ of input shaft 22); an NS2-rotation speed sensor 77 for detecting a rotation speed NS2 of the sun gear S2 of the second planetary gear unit 16; an AT oil temperature sensor 78 for detecting an AT oil temperature $T_{OIL}$ representing a temperature of hydraulic oil filled in the hydraulic control circuit 98; an upshift switch 80; and a downshift switch 82, etc. are provided. These sensors and switches provide the electronic control device 90 with the engine rotation speed NE, the intake air quantity Q, the intake air temperature $T_A$, the throttle valve opening degree $θ_{TH}$, the vehicle speed V, engine coolant temperature $T_W$, presence/absence of the brake operation, lever position $P_{SH}$ of the shift lever 72, the turbine rotation speed NT, the sun gear rotation speed NS2, the AT oil temperature $T_{OIL}$, an upshift command $R_{UP}$ for a shift range, and a downshift command $R_{DN}$, etc.

Figure 4:
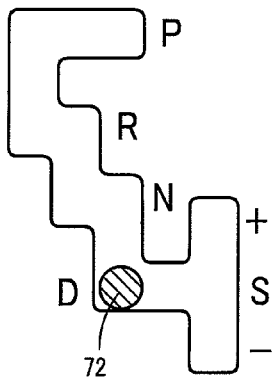
FIG. 4 is a view showing one example of a shift pattern of a shift lever shown in FIG. 3.

The shift lever 72 mounted in an area close proximity to for instance a driver's seat as shown in FIG. 4, is arranged to be manually operated to five lever positions "P (Parking)", "R (Reverse)", "N (Neutral)", "D (Drive)" or "S (Sequential)". The position "P" is a parking position under which the automatic transmission 10 lies in a neutral state (indifferent state) to interrupt a power transfer therein, and the output shaft 24 is mechanically blocked (locked) by means of a mechanical parking mechanism. The position "R" is a reverse-drive running position for reverse-drive running to be performed under which the first reverse-drive gear position "Rev1" or the second reverse-drive gear position "Rev2" is established. The position "N" is a neutral position under which the power transfer in the automatic transmission 10 is interrupted with the automatic transmission 10 lying in the neutral state (indifferent state).

Further, the position "D" is a forward-drive running position under which an automatic shift mode (Range "D") is established for executing a shift control using all of the forward-drive gear positions including the 1st-speed gear position "1st" to the 8th-speed gear position "8th" covering a whole of the shift areas of the automatic transmission 10. The position "S" is a forward-drive running position under which switching the shift ranges of the plural kinds, of which shift area in a higher speed area of the forward drive gear position is limited, establishes a sequential mode (hereinafter referred to as an "S-mode") to effectuate a manual shift. The position "S" has an upshift position "+" for the shift range to be shifted to an upper area (higher speed area), and a downshift position "−" for the shift range to be shifted to a down area (lower speed area), for every operation of the shift lever 72. These operations are detected by the upshift switch 80 and the downshift switch 82, respectively. Since both the upshift position "+" and the downshift position "−" are unstable, the shift lever 72 is arranged to automatically return to the position "S" with urging means such as a spring or the like. This allows the shift range to be altered depending on the number of times the shift lever 72 being operated to the upshift position "+" or the downshift position "−".

In FIG. 3, the electronic control device 90 includes a so-called microcomputer comprised of for instance a CPU, a RAM, a ROM and input and output interfaces, etc. The CPU executes signal processing in accordance with programs preliminarily stored in the ROM, while utilizing a temporarily storing function of the RAM. This allows the executions of an output control of the engine 30 and the shift control of the automatic transmission 10. The electronic control device 90 may be arranged in separate structures to perform an engine control and a shift control depending on needs.

Figure 5:
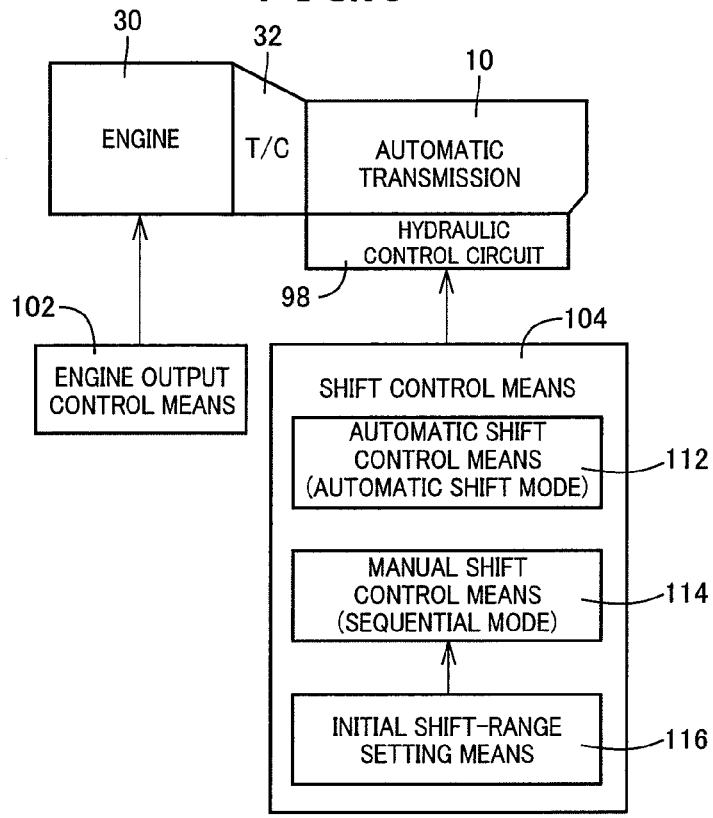
FIG. 5 is a block diagram illustrating a function of an electronic control device shown in FIG. 3.

FIG. 5 is a functional block diagram illustrating a major part of a control function to be executed by the electronic control device 90. In FIG. 5, engine output control means 102 allows a throttle actuator to controllably open or close the electronic throttle valve for performing a throttle control, allows a fuel injection device to control a fuel injection for performing the fuel injection control, and allows an ignition device such as an ignition etc. to control an ignition timing for performing the ignition timing control. Thus, the output control of the engine 30 is executed, controlling ignition timing of an ignition device such as an igniter or the like for performing an ignition timing control. On performing the throttle control, the throttle actuator is driven based on the accelerator opening Acc by referring to a preliminarily stored relationship such that the greater the accelerator opening Acc, the greater desire be the throttle valve opening $\theta_{TH}$.

Figure 6:
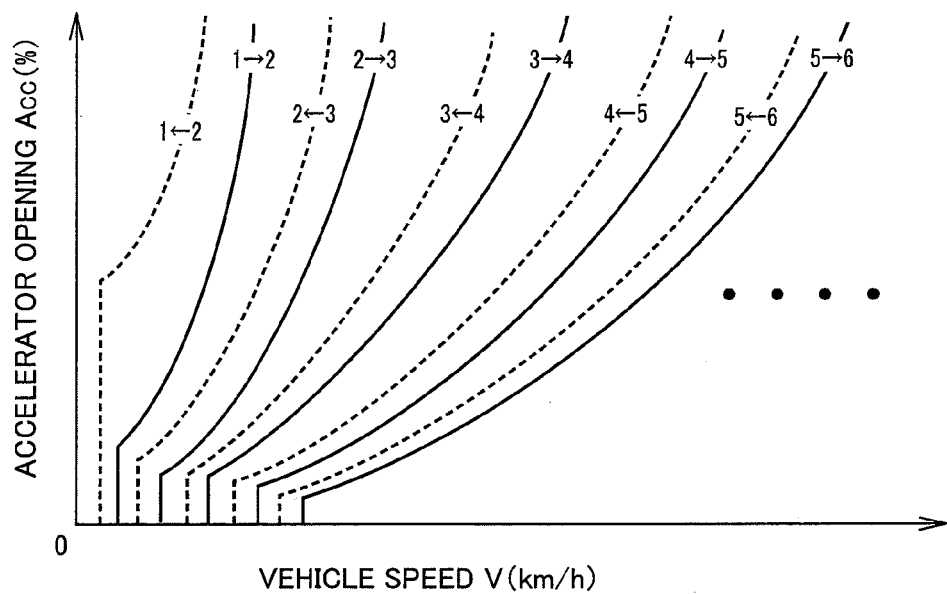
FIG. 6 is a view illustrating one example of a shifting map through which a plurality of gear positions of the vehicular automatic transmission shown in FIG. 1 are automatically switched depending on a drive state.

Shift control means 104, serving to perform the shift control in the automatic transmission 10, establishes the automatic shift mode (Range "D") when the shift lever 72 is operated to the position "D". Automatic shift control means 112 performs an automatic shift using a whole of the forward drive gear positions "1st" to "8th" in accordance with a program preliminarily set in terms of parameters including for instance the vehicle speed V and the accelerator opening Acc as shown in FIG. 6. A shifting map shown in FIG. 6 corresponds to a shifting rule with a solid lien indicating an upshift line for the upshift to be determined and a broken line indicating a downshift line for the downshift to be determined.

Further, with the shift lever 72 operated to the position "S", the S-mode is established, in which manual shift control means 114 executes the following operations. In detail, the manual shift control means 114, in accordance with the upshift command $R_{UP}$ and the downshift command $R_{DN}$, sequentially switches the shift range form the eight shift ranges "D", "7", "6", "5", "4", "3", "2" and "L", having different highest speed gear positions, i.e., different shift ranges in higher speed areas with lower speed ratios, to that to the higher speed area (upshift area) or the lower speed area (downshift area), and performs the automatic shift control within a shift area of each shift range in accordance with a shifting map shown in FIG. 6. Accordingly, if the shift lever 72 is repeatedly operated to the downshift position "−" on running on for instance a downhill, the shift range is switched from for instance the range "6" to the range "5", the range "4" and the range "3" such that the downshift is sequentially effectuated from the 6th-speed gear position "6th" to the 5th-speed gear position "5th", the 4th-speed gear position "4th" and the 3rd-speed gear position "3rd". This increases an engine braking effect. With the 1st-speed gear position "1st" established in the S-mode, the brake B2 is engaged such that an engine braking action is obtained.

The S-mode corresponds to a manual shift mode, and a plurality of shift ranges "D" to "L" switched in accordance with the operation on the shift lever effectuated by the driver in the S-mode represents shift levels. The upshift command $R_{UP}$ and the downshift command $R_{DN}$ correspond to shift commands, respectively. Further, the position "S" represents a manual shift mode selecting position. In the present embodiment, the shift lever 72 can not be moved to the position "S" unless it moves with a route of the position "D" representing an automatic shift mode selecting position. Thus, the shift lever 72 can be operatively switched to the S-mode presuming that the automatic shift mode is currently selected. The shift lever 72 corresponds to the selection operating member.

Figures 7, 8:
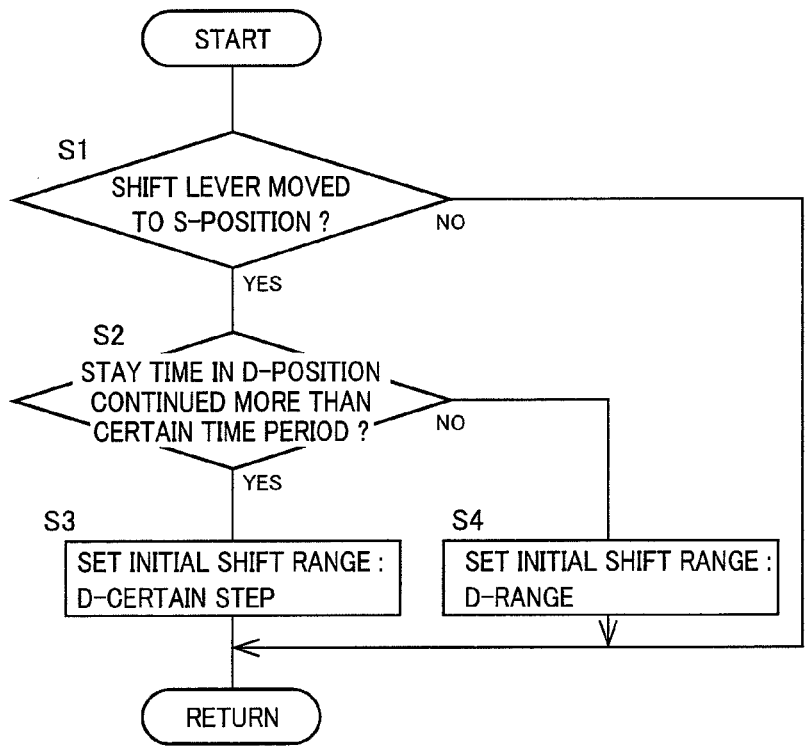
FIG. 7 is a view illustrating shift ranges that can be switched through the operation of the shift lever shown in FIG. 4.
FIG. 8 is a flowchart concretely illustrating initial shift-range setting means shown in FIG. 5 performs signal processing.

The shift control means 104 further includes initial shift-range setting means 116 having a function to serve as initial shift-level setting means, with which an initial shift range is set in the beginning of the S-mode in accordance with a flowchart shown in FIG. 8. In step S1 in FIG. 8, whether the shift lever 72 is operatively moved to the position "S" is determined. If the shift lever 72 is operatively moved to the position "S", a determination is made in step S2 as to whether a stay time in the position "D", i.e., a duration time of the automatic shift mode, exceeds a predetermined certain time period. Step S2 is executed for determining the driver's will selecting the S-mode. More particularly, when the shift control is executed in the automatic shift mode, and the vehicle runs too fast on running on a downhill due to no adequate engine braking effect, a determination is made as to whether the shift lever 72 is operatively switched to the S-mode for increasing the engine braking effect, or whether the S-mode is selected for achieving drive performance by positively switching the gear shift positions in the S-mode with no concern to the engine braking effect. The certain time period may adequately has a value in the order of for instance several seconds to ten seconds. The stay time in the position "D" can be measured based on a signal representing the lever position $P_{SH}$ output from the lever position sensor 74.

If the stay time in the position "D" exceeds the certain time period, i.e., during the shift mode switching in which it is considered that the automatic shift mode is operatively switched to the S-mode with the driver's will to have an increasing engine braking effect, in step S3, a shift range (range "7" or "6") lower than that in the range "D" by a certain step (for instance, one to two step(s)) is determined as the initial shift range. When the vehicle runs too fast on the downhill, the accelerator opening Acc generally remains fully closed with accelerator-OFF, and hence, the gear position for the automatic shift mode lies at the 8th-speed gear position "8th" representing the highest speed gear position. Thus, the shift range in the lower speed area than that of the range "D" is set as the initial shift range, and the manual shift control means 114 begins executing the shift control in the S-mode so that the automatic transmission 10 initiates a downshift to the 7th-speed gear position "7th" or the 6th-speed gear position "6th", resulting in immediate increase in engine braking effect. For the number of step(s) to be lowered in the shift range, a certain number of step(s) may be determined in advance, but the number of step(s) to be lowered may be determined depending on for instance the vehicle speed V and the road surface gradient or the like.

Further, there is a case wherein (i) stay time in the position "D" does not satisfy the certain time period, i.e., the shift lever 72 is moved from the position "N" to the position "S" within a short time period to immediately pass to the position "D" during the vehicle running or the halt of the vehicle, and (ii) the driver does not desire to have the increasing engine braking effect. This case corresponds to the a manual shift mode direct-selecting, in which step S4 is executed to uniformly set the range "D" with the maximum speed having the widest shift area as the initial shift range irrespective of a drive state such as the vehicle speed V or the like. This performs an appropriate shift control as intended by the driver using all of the gear positions ("1st" to "8th") in the same manner as that accomplished in the automatic shift mode, until the shift lever 72 is operated to the upshift position "+" or the downshift position "−" with the desire to alter the shift range. For instance, on selecting the S-mode with the desire to obtain drive performance in the S-mode during the vehicle running, the shift range in the lower speed area is set like the operation executed in the shift mode switching (step S3). This prevents the downshift from achieving in the automatic transmission 10 against the driver's will, causing no uncomfortable feeling to the driver.

Further, when the vehicle is caused to run with the shift range remained in the lower speed area against the driver's will, or that the S-mode is selected with the desire to obtain drive performance in the S-mode during the halt of the vehicle, the shift range in the lower speed area is set against the driver's will likewise the shift mode switching (step S3). In such a case, the driver succeedingly drives the vehicle without noticing there is a fear of degradations in fuel economy and running performance and increased load of hardware due to rise in oil temperature. The present embodiment can solve such problem.

Thus, with the shift control device of the present embodiment, when shift lever 72 is operatively moved to the position "S" and the S-mode is selected, whether the shift mode belongs to the shift mode switching or the manual shift mode direct-selecting is determined (step S2), based on whether the S-mode is switched from the automatic shift mode and whether the automatic shift mode continuing for a period longer than the predetermined certain time period, i.e., more particularly, whether the stay time in the position "D" exceeds the certain time period. The initial shift levels are separately set for the shift mode switching (YES in step S2) and the manual shift mode direct-selecting (NO in step S2). That is, when the shift lever 72 cannot be operatively moved to the position "S" unless it is moved in route through the position "D", in other words, the S-mode can be selected presuming that the automatic shift mode is currently selected, when the shift lever 72 is immediately moved from the position "N" to the position "S" during the halt or the vehicle running, then, the manual shift mode direct-selecting with the S-mode being directly selected is determined. This can be discriminated from the shift mode switching from the automatic shift mode. Thus, appropriate initial shift levels can be set in conformity to the driver's will to have the drive-force source braking effect in the shift mode switching and that not to have the drive-force source braking effect in the manual shift mode direct-selecting.

In the illustrated embodiment, in the shift mode switching (YES in step S2), the shift range in the lower speed area than that in the range "D" by a certain number of step(s), is set as the initial shift range in step S3. Therefore, for instance if the shift mode is switched from the automatic shift mode to the S-mode during the vehicle running on the downhill or the like, the downshift is performed in the automatic transmission 10 so that a certain engine braking effect can be immediately obtained in conformity to the driver's will. In the manual shift mode direct-selecting (NO in step S2), where the shift lever 72 is immediately moved from the position "N" to the position "S" in route through the position "D" during the vehicle running, in step S4, the shift range in the higher speed area, that is lower in speed ratio, than that in the shift mode switching, more particularly, the range "D" with the maximum speed is set as the initial shift range. Thus, uncomfortable feeling to the driver caused by downshift in the automatic transmission 10 performed in the shift mode switching against the driver's will is prevented. Moreover, even in the manual shift mode direct-selecting (NO in step S2), where the shift lever 72 is immediately moved from the position "N" to the position "S" in a route through the position "D" with the desire to obtain drive performance in the position "S" during the halt of the vehicle, step S4 is similarly executed to set the range "D" with the maximum speed as the initial shift range. This performs appropriate shift control as desired by the driver, so that there is no fear of deteriorations in fuel economy and drive performance and increased load of hardware due to rise in oil temperature, even under the succeeding driving.

Next, description of another embodiment according to the present invention will be provided. In the following embodiment, the parts substantially common to those in the above embodiment are added the same reference numerals, and detailed descriptions thereof are omitted.

Figure 9:
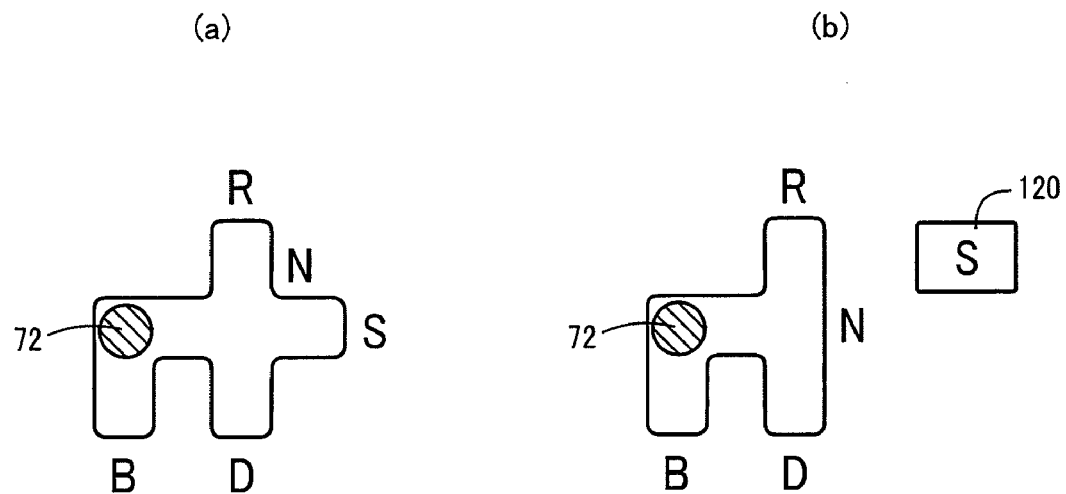
FIG. 9 is a set of views showing other examples of selection operating members that can alternatively select a manual shift mode (S-mode) and an automatic shift mode.

FIG. 9(a) shows a momentary type shift lever in which the shift lever 72 is kept at a normal position shown in FIG. 9(a) at all times, and it has said positions "R (Reverse)", "N (Neutral)", "D (Drive)" and "S (Sequential)", and in addition thereto, a position "B (Brake)" for engine braking. The shift lever 72 is arranged to automatically return to the normal position shown in FIG. 9(a) at all times, and the S-mode can be directly selected by operating the shift lever 72 to the position "S" with no route through the position "D". FIG. 9(b) shows another momentary type shift switch in which the shift lever 72 is also kept at the normal position shown in FIG. 9(b) at all times, and has the positions "R (Reverse)", "N (Neutral)", "D (Drive)" and "B (Sequential)", and in addition thereto, the position "B (Brake)". In addition, the shift lever 72 is arranged to automatically return to the normal position shown in FIG. 9(b) at all times, and the S-mode can be directly selected by operatively depressing an S-mode switch 120 that is separately disposed in an area close to the shift lever 72. The S-mode switch 120 is an automatic returning type switch, and is arranged such that when continuously depressed for a certain time period or more, a selection of the S-mode is determined. The S-mode switch 120 corresponds to a selection operating member.

Figure 10:
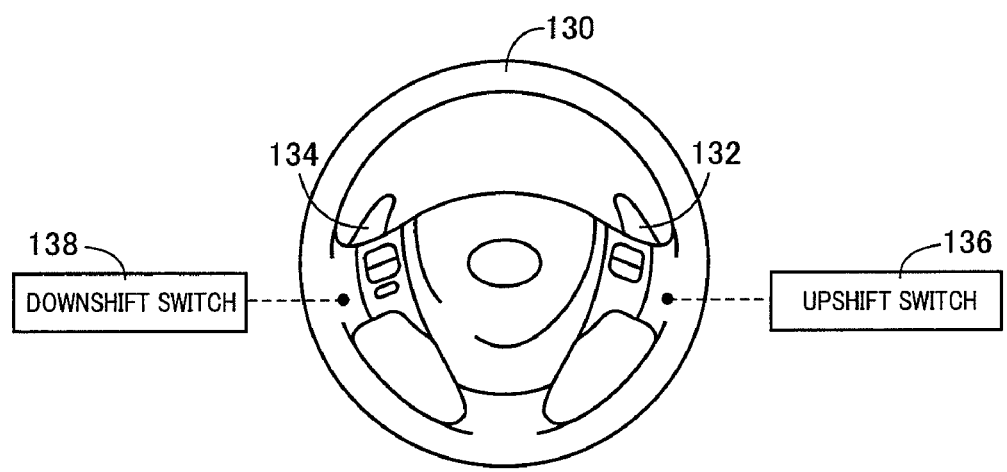
FIG. 10 is a view illustrating one example of an operating member manually operated to perform up/down of a shift range when the manual shift mode is selected with the selection operating member shown in FIG. 9.

As shown in FIG. 10, meanwhile, a steering wheel 130 is provided with an upshift paddle 132 and a downshift paddle 134. When the S-mode is selected by the shift lever 72 or the S-mode switch 120, if the paddles 132 and 134 are operatively pulled to this sides (toward the driver), an upshift switch 136 and a downshift switch 138 output the upshift command $R_{UP}$ and the downshift command $R_{DN}$ to the electronic control device 90 respectively. This causes the manual shift control means 114 to switch the shift range to that to the higher speed area (upshift area) or the lower speed area (downshift area) from the eight shift ranges "D", "7", "6", "5", "4", "3", "2" and "L" in sequence. Then, shifting of the automatic transmission 10 is performed automatically in accordance with the shifting map shown in FIG. 6, within the shifting area of each shift range. Moreover, the present invention can be implemented in various modes with one alternative in which the steering wheel 130 has push-buttons for an upshift and a downshift instead of the paddles 132 and 134, and another alternative in which a steering column is provided with levers for the upshift and the downshift.

Figure 11:
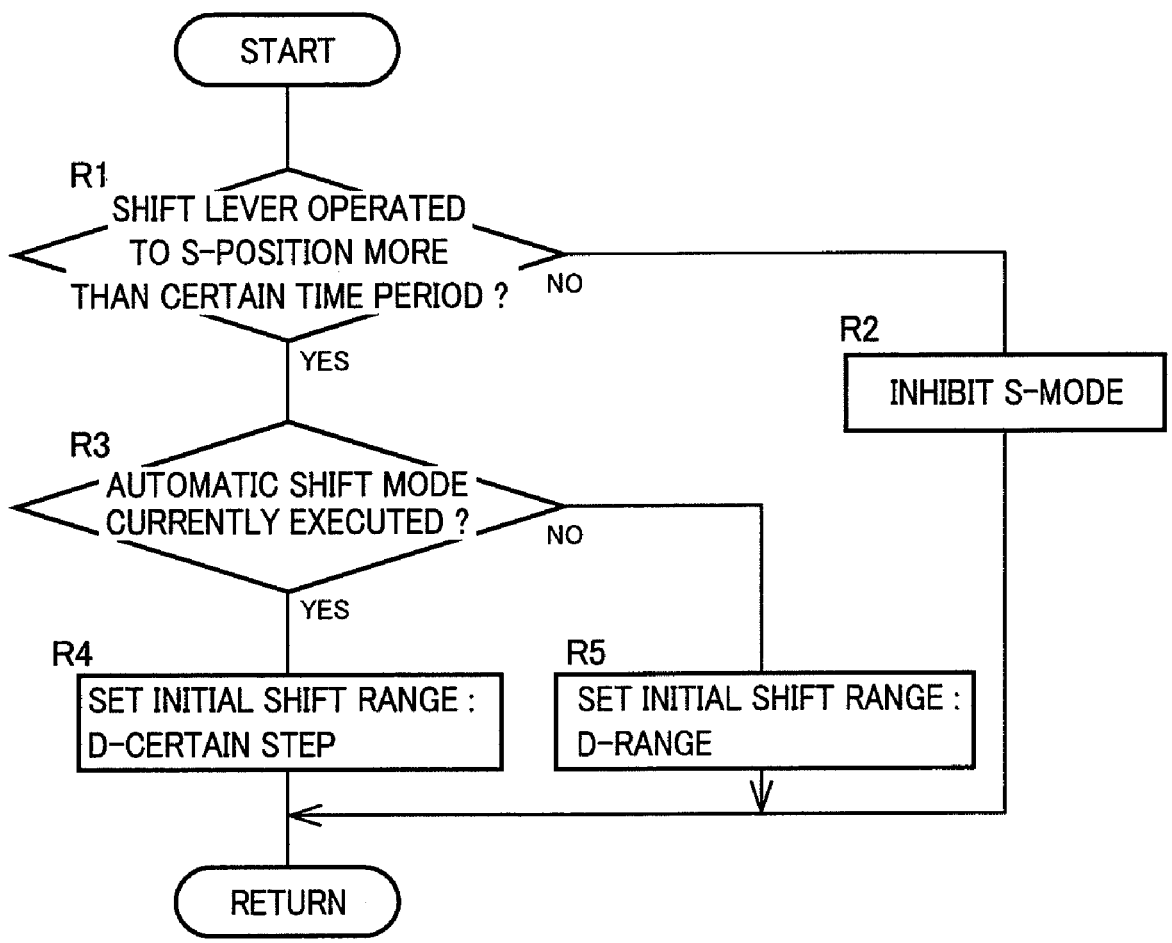
FIG. 11 is a flowchart concretely illustrating signal processing performed in embodiments shown in FIGS. 9(a) and 9(b) and FIG. 10 when the initial shift range is determined by the initial shift-range determining means.

In the present embodiment, an initial shift range is set for the S-mode being selected in accordance with for instance a flowchart shown in FIG. 11. For the case of FIG. 9(a), in step R1 in FIG. 11, whether the operation time of the shift lever 72 to be operated to the position "S" is equal to a certain time period or to be longer is determined, and for the case of FIG. 9(b) whether the operation time of the S-mode switch 120 to be depressed is equal to a certain time period or to be longer is determined. These certain time periods are provided for preventing the mode switching due to erroneous operations. For instance, the certain time periods may be set to an appropriate time in the order of 0.5 seconds. If the operation time is less than the certain time period, switching to the S-mode is inhibited in step R2.

If the operation time of the shift lever operation to the position "S" or the depressive time of the S-mode switch 120 continues for the certain time period or longer and the answer in step R1 is YES (positive), then, step R3 is executed. In detail, a determination is made as to whether the automatic shift mode where the automatic shift control means 112 performs the shift control is currently under the execution. In such a case, if the shift lever 72 is temporarily operated to the position "D" due to erroneous operation or mistake by the driver, and immediately thereafter, operated to the position "S" or the S-mode switch 120 is depressed, it is regarded that no shift control under the automatic shift mode is substantially executed, and the driver does not desire to have the engine braking effect. Like the operation in step S2, whether the duration time of the automatic shift mode continuing for the certain time period or more is determined. In the present embodiment, the certain time period may have the same order as that of the above embodiment, and may be a short time period in the order of for instance several seconds.

If the determination in step R3 is YES (positive), i.e., in the shift mode switching conceived that the automatic shift mode is operatively switched to the S-mode by the driver desiring to have the increasing engine braking effect, step R4 is executed. In detail, the shift range (the ranges "7" or "6") in the lower speed area than that of the range "D" by a certain step(s) (for instance, one to two step(s)), is set as the initial shift range like the operation in step S3. Further, when the determination in step R3 is NO (negative), in the manual shift mode direct-switching where it is conceived that the driver has no particular desire to have the increasing engine braking effect, i.e., the automatic shift mode is switched to the S-mode for an extremely short time period due to erroneous operation or the like or the S-mode is directly selected during the running and the halt of the vehicle. Then step R5 is executed. In detail, same as in step S4, the range "D" having the maximum speed with the widest shift area is uniformly set as the initial shift range, regardless of the drive state such as the vehicle speed V or the like.

Even with the present embodiment, if the S-mode is selected, a determination is made (step R3) to discriminate which of the shift mode switching and the manual shift mode direct-selecting is currently selected based on whether the S-mode is switched from with the automatic shift mode and whether the automatic shift mode continuing for the predetermined certain time period or more. Then, the initial shift levels are individually set for the shift mode switching (YES in step R3) and the manual shift mode direct-selecting (NO in step R3), so that the same advantageous effect as that achieved in the above embodiment is rendered.

While the embodiments of the present invention has been described above with reference to the drawings, it is intended that the embodiments described be considered only as illustrative embodiments and that the present invention may be implemented in various modifications and improvements based on knowledge of those skilled in the art.

The invention claimed is:

1. A shift control device for a vehicular automatic transmission including:
   a manual shift mode which switches a shift level to that to a higher speed area or a lower speed area sequentially from a plurality of predetermined shift levels in accordance with a shift command based on a manual operation by a driver;
   an automatic shift mode in which gear ratios or gear positions are automatically altered in accordance with a predetermined shift rule; and
   the manual shift mode and the automatic shift mode being alternatively selected by a selection operating member,
   the shift control device comprising:
   initial shift level setting means (i) that determines when the manual shift mode is selected by the selection operating member, a shift mode switching or a manual shift mode direct-selecting based on whether the manual shift mode is switched from the automatic shift mode continuing for a predetermined certain time period or more, and (ii) that sets in the shift mode switching, shift level in a lower speed area than that in the manual shift mode direct-selecting, as an initial shift level in the beginning of the manual shift mode.

2. The shift control device for the vehicular automatic transmission according to claim 1, wherein the shift levels are a plurality of shift ranges different in shift areas in higher speed area with lower speed ratios in a continuously variable transmission or a step-variable transmission.

3. The shift control device for the vehicular automatic transmission according to claim 1, wherein the shift level are the speed ratio of a continuously variable transmission or a plurality of gear positions of a step-variable transmission.

* * * * *